United States Patent [19]

Bonisch

[11] 4,111,068

[45] Sep. 5, 1978

[54] LOCKING REDUNDANT LINK

[76] Inventors: James C. Fletcher, Administrator of the National Aeronautics and Space Administration, with respect to an invention of Frank Henry Bonisch, Wethersfield, Conn.

[21] Appl. No.: 775,239

[22] Filed: Mar. 7, 1977

[51] Int. Cl.² ........................ G05G 1/04; B65C 27/42
[52] U.S. Cl. ..................................... 74/586; 403/105; 416/61
[58] Field of Search .................. 74/579 R, 581, 586; 416/61, 2; 244/17.13; 403/105, 109, 328

[56] References Cited

U.S. PATENT DOCUMENTS

| | | | |
|---|---|---|---|
| 2,050,187 | 8/1936 | Klemperer | 74/581 |
| 2,453,855 | 11/1948 | Oliver | 74/586 X |
| 3,161,395 | 12/1964 | Carter | 403/105 X |
| 3,736,010 | 5/1973 | Larkin | 416/61 |
| 3,763,666 | 10/1973 | Tibussek | 403/109 |

*Primary Examiner*—N. P. Godici
*Attorney, Agent, or Firm*—Howard J. Osborn; John R. Manning; Wallace J. Nelson

[57] ABSTRACT

A low-friction, axially extensible strut, automatically lockable in both tension and compression, for use as a secondary load path in helicopter main rotor force measurement systems.

14 Claims, 6 Drawing Figures

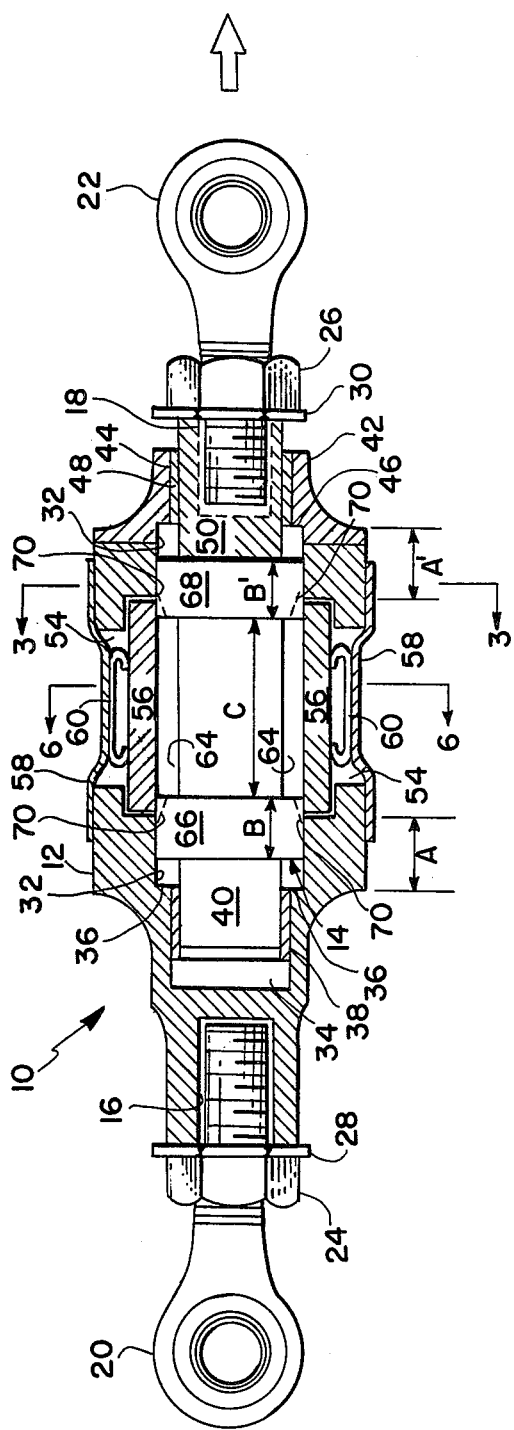
FIG. 1
FIG. 4
FIG. 3

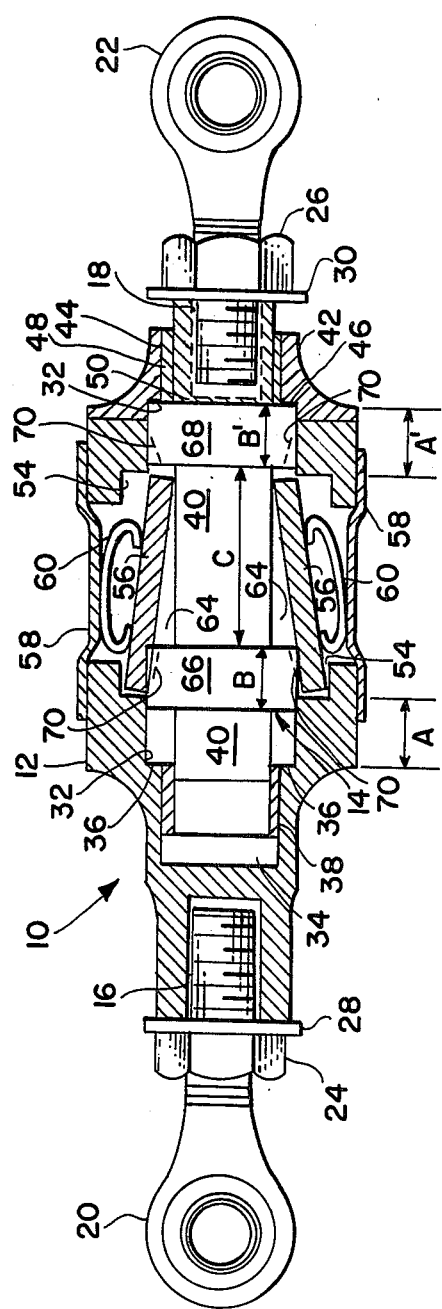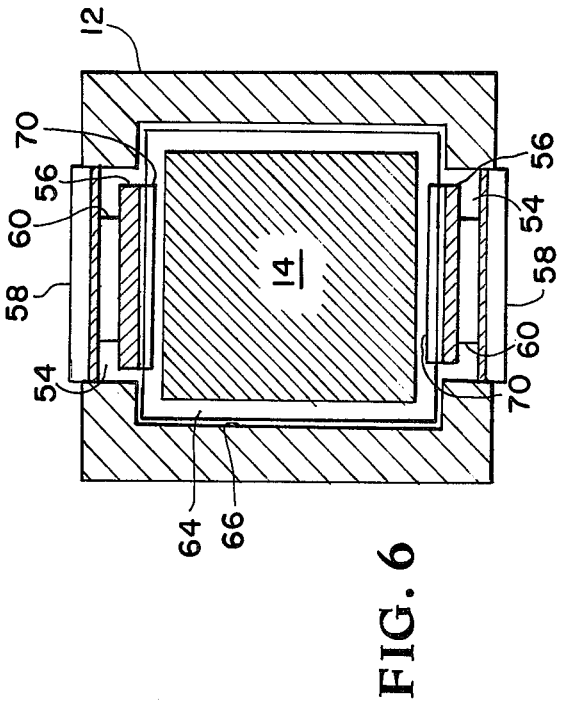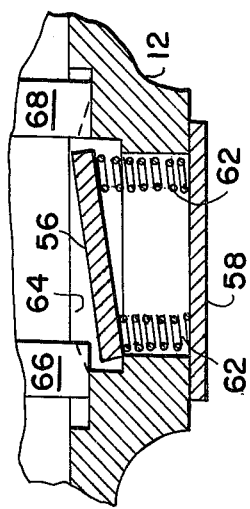

LOCKING REDUNDANT LINK

ORIGIN OF THE INVENTION

The invention described herein was made in the performance of work under a NASA contract and is subject to the provisions of Section 305 of the National Aeronautics and Space Act of 1958, Public Law 75-568 (72 Stat. 435; 42 USC 2457).

BACKGROUND OF THE INVENTION

This invention relates generally to a normally axially extensible strut capable of being locked in order to carry tension and compression loads, and more particularly to a low-friction, axially extensible secondary link between a helicopter main rotor force measurement system and the helicopter frame, which is automatically lockable and capable of transmitting both tension and compression loads to the helicopter frame in the event of primary link failure.

DESCRIPTION OF THE PRIOR ART

Safety considerations dictate that helicopter main rotor force measurement systems employ a secondary or backup strut to transfer rotor loads from the force measurement platform to the helicopter frame in the event of failure of the primary load measuring link. In order to perform satisfactorily, a secondary strut must be strong enough to transfer all rotor loads to the helicopter frame, and should be as passive and/or frictionless as possible during normal operating conditions so as not to skew the primary system force readings. It should further be capable of automatic and positive deployment in the event of primary link failure. Additionally, the secondary strut must be reliable, lightweight and capable of, when locked, transferring both tension and compression loads with a minimum of free-play to the helicoptor frame, and it is desirable that the strut be economical to manufacture, easily serviced and reusable.

Several existing struts meet some but not all of the above-mentioned criteria. One type of presently available strut consists of a rigid loading bearing member having oversized bearings which are partially bushed with rubber or other elastomeric material. During normal operation, the rubber bushings are partially compressed and expanded as movement occurs between the force measurement platform and the helicopter frame. If the primary link fails, the rubber bushings become completely compressed, thus allowing metal-to-metal contact between the struts oversized bearings and the strut locating pins. Disadvantages of this system are the fact that the compression and expansion of the rubber bushings skew the normal force readings, thus necessitating that the spring rates of the rubber bushings be known and tailored to each specific application; and extreme amount of free play necessary in the bearings to prevent metal-to-metal contact during normal operation; and the fact that the strut becomes dynamically unstable if failure of the rubber bushings occurs.

A second type of strut currently in use consists of a hydraulic body connected between the force measurement platform and the helicopter frame. During normal operation the body is free to extend or compress axailly. Upon failure of the primary system, the strut may be locked hydraulically by remote signal. Disadvantages of this system lie in its complexity, weight and expense, and the fact that an external power source is necessary to operate it.

Yet another strut design currently in use is an eccentric redundant strut comprising a compressible load bearing central member having eccentric mounting holes carried in spherical bearings at each end. During normal operation, the rotation of the spherical bearing-mounted eccentric allows the strut to adjust its length as the force measurement platform deflects with respect to the helicopter frame. Upon activation, a pin contained within the central member engages the spherical bearings, preventing rotation thereof and creating an extensible link. The major disadvantage of this strut is the high degree of feedback between the force measurement platform and frame due to friction inherent in the spherical bearings.

SUMMARY OF THE INVENTION

Accordingly, one object of the present invention is to provide a reliable, lightweight and reusable axially extensible secondary strut for use as a secondary load path in helicopter main rotor force measurement systems.

Another object of the present invention is to provide an axially extensible secondary strut which is automatically lockable.

Yet another object of the present invention is to provide an axially extensible secondary strut which is capable of low friction extensibility during its normal operating mode.

A further object of the present invention is to provide an axially extensible strut capable of transferring both tension and compression loads with a minimum of free play during its locked operating mode.

According to one embodiment of the present invention, the foregoing and other objects are attained by providing a body having a piston slidably disposed therein. The piston and body are such provided with an adjustable rod and end so that the strut may be attached at one end to the helicopter main rotor measuring platform and at the other end to the helicopter frame. The body is also provided with a pair of axially disposed recesses each having an inwardly biased, spring-loaded locking plate disposed therein and a boss at each axial extremity to limit the maximum displacement of the piston within the body. The piston is further provided with a circumferential recess which is shorter in the axial direction than the above-mentioned locking plates and which serves to receive one end of the locking plates when they are inwardly disposed in the lock position. Furthermore, the piston, piston recess, body, locking plates and body recesses are configured with respect to one another such that the axial distance between each end of the piston and the edge of the piston recess is shorter than the axial distance between the body bosses and the near end of the locking plates and the axial length of the piston recess is less than the axial length of the locking plates. This configuration results in a strut which will lock automatically when the piston reaches either extremity of its travel, and only at the positions, with the body bosses and locking plates prevent axial movement of the strut.

Various other objects and advantages of this invention will appear from the following detailed description of the preferred embodiment thereof when considered in connection with the accompanying drawings.

BRIEF DESCRIPTION OF THE DRAWINGS

FIG. 1 is a cutaway plan view of a lockable, axially extensible strut constructed according to the present invention showing the strut in the unlocked or normal operation mode;

FIG. 2 is a cutaway plan view of a lockable, axially extensible strut showing the strut in the locking or load-bearing mode;

FIG. 3 is a sectional view taken along section lines 3—3 of FIG. 1;

FIG. 4 is a sectional view showing an alternate embodiment of the present invention;

FIG. 5 is a fragmentary cutaway view of the locking plate portion of the strut showing an alternate locking plate spring arrangement; and FIG. 6 is a sectional view taken along lines 6—6 of FIG. 1.

DESCRIPTION OF THE PREFERRED EMBODIMENT

Referring now to the drawings wherein like reference characters designate identical or corresponding parts and more particularly to FIGS. 1 and 2, the lockable, axially extensible strut, designated generally by the reference numeral 10, is comprised basically of a body 12 which is open at one end and has an inner bore 32, and a piston, designated generally by the reference numeral 14, slidably mounted within body 12. Body 12 and piston 14 may be constructed of steel, aluminum or any other workable material. The closed end of body 12 is provided with a threaded bore 16 and piston 14 is provided with a threaded bore 18 disposed toward the opposite end of the strut assembly. Bores 16 and 18 are fitted with threaded rod ends 20 and 22, respectively, in order to provide a means for mounting and adjusting the overall length of strut 10. Lock nuts 24 and 26 and lock washers 28 and 30 serve to prevent the rotation of rod ends 20 and 22 with respect to body 12 and piston 14. End cap 42 is fitted to the open end of body 12 by any conventional means such as screw fasteners or welding and serves to prevent piston 14 from sliding out of body 12. Still referring to FIGS. 1 and 2, it may be seen that the inner end of body bore 32 is provided with a bore 34 having a dimension smaller than body bore 32, thus forming a boss 36 which limits the inward movement of piston 14. Bushing 38 is press-fitted in bore 34 and provides a bearing surface on which the end 40 of piston 14 may slide. In a similar manner, end cap 42 is provided with a bore 44 also having a diameter smaller, than body bore 32, thus forming a second boss 46 which limits the outward movement of piston 14. Bushing 48 is press-fitted in bore 44 and provides a bearing surface on which piston neck 50 may slide. Since piston 14 is slidably mounted on bushings 38 and 48, it is neither necessary nor desirable that piston 14 be in sliding contact with body surface 32. By eliminating sliding contact between body 14 and surface 32, the extension friction of the assembly is greatly reduced.

Body 12 is further provided with a plurality of axially disposed recesses 54 into which are fitted an equal number of rectangular-sectioned locking plates 56. Although only two recesses and two locking plates are shown in the preferred embodiment of the present invention, it should be understood that any workable number of locking plates and recesses may be employed. It is not necessary that the recess 54 be "centered" with respect to bosses 36 and 46, nor that dimensions A and A' be equal. The deflections of the primary link due to tension loading will be greater than compression generated deflections, and thus A' fabricated longer than A. Accordingly, land 66 and 68 (B and B') are not usually of equal axial dimension either. It is necessary at the rigging of the strut assembly that the lands 66 and 68 be assembled in a neutral position relative to the ends of the locking plates 56. Land 68 for instance must be positioned such that under normal extension motions it will continue to overlap plate 56, but in the instance of a tension failure of the primary link, land 68 must have sufficient axial freedom in the recess of A' to allow the plate 56 to pass to its locking position. Recesses 54 are covered at their external terminii by cover plates 58 which may be secured to the body by any conventional means such as threaded fasteners. Locking plates 56 are biased radially inward by leaf springs 60. FIG. 5 shows an alternate arrangement for biasing locking plates 56 radially inward in which a pair of coil springs 62 are substituted for leaf spring 60.

Piston 14 is further provided with a perimetric recess 64, extending entirely around piston 14 and having an axial length, dimension C, shorter than the axial length of locking plates 56. The operation of the locking plate 56 is similar to that of the same element shown in FIG. 2.

Referring now to FIG. 3, it should be noted that the cross-sectional configuration of piston 14 and body bore 32 is retangular. A rectangular or square piston and body configuration is preferred since achievement of full surface bearing contact for the ends of locking plate is obtained to react the high imposed loads.

FIG. 4 is an alternate embodiment of the present invention in which the cross-sectional configuration of piston 14 and body 12 is circular. A circular configuration is desirable and for its ease of manufacture, however, provides line contact between locking plates and piston shoulder and is not capable of handling as heavy loads. Regardless of piston/body configuration, the operating principles and part of both embodiments are similar.

FIG. 6 taken along line 6—6 of FIG. 1 provides a different perspective of locking plates 56, recesses 54 and piston recesses 64.

OPERATION

In operation, strut 10 is attached at one end to the helicopter measurement platform (not shown) and at the other end to the helicopter frame (not shown) by means of rod ends 20 and 22. Rod ends 20 and 22 are adjusted axially such that piston 14 is generally axially aligned relative to the ends of the locking plates within bore 32. With the piston in this position, locking plates 56 are restrained radially outward by, and are in sliding contact with, piston lands 66 and 68, as shown in FIG. 1. With the locking plates so restrained, piston 14 is free to move axially with respect to body 12 with a minimum of friction, and thus adjust to differences in distance between the aforementioned force measurement platform and frame as the helicopter undergoes its operational evolutions. Friction may be further reduced by the application of appropriate lubrication to bushings 38 and 48 and to the interfaces between locking plates 56 and piston lands 66 and 68.

In the event of primary link failure, the helicopter force measurement platform attempts to either pull away from or move toward the helicopter frame, depending upon whether the rotor is exerting a tension or compression load on the helicopter at the time of failure. Under such circumstances strut 10 will either extend or contract until piston 14 is in contact with boss 36 or boss 46 and piston land 66 or 68 has moved past the edges of recesses 54.

As shown in FIG. 2 the strut is locked in the position of maximum extension. The locking process occurs when piston land 68 begins to move past the edge of recesses 54. At this time locking plates 56 begin to move radially inward, along beveled lead in surfaces 70, due to the force of springs 60. Once land 68 has moved completely past the edge of recesses 54, locking plates 56 spring inwardly and engage piston recess 64 thus locking the strut. Hence, it may be seen that once strut 10 is locked in the extended position, further extension is prevented by boss 46 and contraction is prevented by locking plates 56. Conversely, when strut 10 is locked in the contracted or compressed position boss 36 prevents further compression and locking plates 56 prevent extension.

It should be noted that the relative axial dimensions of locking plates 56, the distance between body bosses 36 and 46 and the edge of recesses 54 (dimension A and A', respectively) piston lands 66 and 68 (dimension B and B', respectively) and piston recess (dimension C), wherein A is less than A' and B is less than B', C less than the axial length of locking plates 56, allow locking plates 56 to engage piston recess 64 only when piston 14 is in a position of maximum extension or compression with respect to body bore 32. Once locked, strut 10 may be restored to its normal axially extensible operating mode by removing covers 58, disengaging locking plates 56 from piston recess 64, and placing piston 14 in a generally central position within body bore 32.

Obviously, numerous modifications of the present invention are possible in light of the above teachings. It is therefore to be understood that within the scope of the appended claims the invention may be practiced otherwise than as specifically desired herein.

What is claimed as new and desired to be secured by Letters Patent of the United States is:

1. An axially extensible strut, automatically lockable in both tension and compression, comprising:
   a body means;
   a piston means disposed within said body means and normally slidable therein, and
   means for locking said piston means to said body means in both tension and compression in response to the piston being moved a predetermined distance in the tension direction and for locking said piston means to said body means in both tension and compression in response to the piston being moved a predetermined distance in the compression direction.

2. A strut as in claim 1 wherein said means for locking said piston means to said body means is movable plate means, and further comprising:
   means for biasing said movable plate means toward a locked position, and
   means for restraining said biased movable plate means from a lock position during the normal unlocked axially extensible operating mode.

3. A strut as in claim 2 wherein said movable plate means comprises a plurality of movable, equal length locking plates.

4. A strut as in claim 3 wherein said body means further comprises a plurality of axial recesses open to the interior of said body means and having an equal plurality of said movable locking plates disposed therein such that said locking means are movable inward.

5. A strut as in claim 4 wherein said movable locking plates are constrained from moving inward by the surfaces of said piston means during the normal unlocked axially extensible operating mode.

6. A strut as in claim 5 wherein said body means is further provided with internal boss means located at the axial extremities thereof to limit the maximum axial movement of said piston means within said body means, and said piston means is provided with means to engage said plurality of movable locking plates upon the inward movement thereof.

7. A strut as in claim 6 wherein said means to engage said plurality of movable locking plates comprises a perimetric recess in the surface of said piston means extending entirely therearound.

8. A strut as in claim 7 wherein the axial length of said piston means recess is shorter than the axial length of each of said plurality of locking plates.

9. A strut as in claim 8 for use as a secondary load path between a helicopter main rotor force measurement system and the helicopter frame, wherein the axial distances between each of said body means boss means and the near end of each of said plurality of locking plates are different and wherein the distance between each end of said piston means and the edge of said piston means recess are different and less than the distance between said body means boss means and the near end of each of said plurality of locking plates.

10. A strut as in claim 9 further comprising spring means for biasing each of said plurality of locking plates inwardly and wherein the edges of said piston means recess are provided with a beveled lead-in surface.

11. A strut as in claim 10 wherein said spring means comprise leaf springs.

12. A strut as in claim 10 wherein said springs comprise coil springs.

13. A strut as in claim 10 wherein the cross-sectional configuration of said piston means and said body means is circular.

14. A strut as in claim 10 wherein the cross-sectional configuration of said piston means and said cylinder means is rectangular.

* * * * *